United States Patent
Yang et al.

(10) Patent No.: US 9,344,315 B2
(45) Date of Patent: May 17, 2016

(54) TRANSMITTING SYSTEM AND RECEIVING SYSTEM, AND TRANSMITTING METHOD AND RECEIVING METHOD

(71) Applicant: Wuhan Research Institute of Posts and Telecommunications, Wuhan, Hubei Province (CN)

(72) Inventors: Qi Yang, Wuhan (CN); Cai Li, Wuhan (CN); Zhu Yang, Wuhan (CN); Shaohua Yu, Wuhan (CN)

(73) Assignee: Wuhan Research Institute of Posts and Telecommunications, Wuhan, Hubei Province (CN)

( * ) Notice: Subject to any disclaimer, the term of this patent is extended or adjusted under 35 U.S.C. 154(b) by 24 days.

(21) Appl. No.: 13/791,036

(22) Filed: Mar. 8, 2013

(65) Prior Publication Data

US 2014/0037023 A1 Feb. 6, 2014

(30) Foreign Application Priority Data

Jul. 31, 2012 (CN) .......................... 2012 1 0270586

(51) Int. Cl.
*H04L 27/36* (2006.01)
*H04L 27/26* (2006.01)
(Continued)

(52) U.S. Cl.
CPC ........ *H04L 27/2627* (2013.01); *H04L 27/0008* (2013.01); *H04L 27/183* (2013.01);
(Continued)

(58) Field of Classification Search
CPC ............................ H04L 1/0003; H04L 1/0009
USPC .................. 375/298, 295, 340, 320, 330, 308
See application file for complete search history.

(56) References Cited

U.S. PATENT DOCUMENTS

2006/0176802 A1* 8/2006 Ko et al. ................ 370/208
2007/0032220 A1 2/2007 Feher
(Continued)

FOREIGN PATENT DOCUMENTS

CN 101018105 8/2007
CN 101022446 8/2007
(Continued)

OTHER PUBLICATIONS

Lu, et al., "40-Gbaud 16-QAM transmitter using tandem IQ modulators with binary driving electronic signals", Optics Express, vol. 18, No. 22, Oct. 25, 2010, pp. 23062-23069.
(Continued)

*Primary Examiner* — David S Huang
(74) *Attorney, Agent, or Firm* — Foley & Lardner LLP

(57) ABSTRACT

A transmitting system, a receiving system, a transmitting method and a receiving method capable of implementing communications with multiple rates are described. The transmitting system comprises: a transmitting-side selection apparatus for selectively inputting input bit data to one of a first constellation mapping modulation apparatus and a second constellation mapping modulation apparatus based on a rate to be transmitted; the first constellation mapping modulation apparatus for performing a first constellation mapping modulation on the signal input thereto based on a selection made by the transmitting-side selection apparatus, so as to obtain a constellation-mapped signal; the second constellation mapping modulation apparatus for performing a second constellation mapping modulation on the signal input thereto based on the selection made by the transmitting-side selection apparatus, so as to obtain a constellation-mapped signal; and an OFDM modulation apparatus for performing an OFDM modulation on the constellation-mapped signal to obtain an OFDM-modulated signal for transmission.

22 Claims, 6 Drawing Sheets

(51) Int. Cl.
*H04L 27/00* (2006.01)
*H04L 27/18* (2006.01)
*H04L 27/34* (2006.01)
*H04L 5/00* (2006.01)

(52) U.S. Cl.
CPC ........ *H04L27/2649* (2013.01); *H04L 27/3455* (2013.01); *H04L 27/3488* (2013.01); *H04L 5/0028* (2013.01); *H04L 5/0044* (2013.01); *H04L 5/0048* (2013.01); *H04L 5/0064* (2013.01); *H04L 27/261* (2013.01); *H04L 27/2655* (2013.01)

(56) References Cited

U.S. PATENT DOCUMENTS

2010/0067367 A1* 3/2010 Choi et al. .................... 370/210
2010/0208640 A1* 8/2010 Cheng et al. .................. 370/311

FOREIGN PATENT DOCUMENTS

| | | |
|---|---|---|
| CN | 101359984 | 2/2009 |
| CN | 101595749 | 12/2009 |
| CN | 101877629 | 11/2010 |

OTHER PUBLICATIONS

Lu, et al., "Reconfigurable multilevel transmitter using monolithically integrated quad Mach-Zehnder IQ modulator for optical 16-QAM and 8-PSK generation", Optics Express, vol. 19, No. 6, Mar. 14, 2011, pp. 5596-5601.

First Office Action for Chinese Application No. 201210270586.4 with English translation, dated Feb. 14, 2016, 12 pages.

* cited by examiner

4QAM constellation map

16QAM constellation map

QPSK constellation map

16PSK constellation map

4QAM hardware diagram

16QAM hardware diagram

TRANSMITTING SYSTEM AND RECEIVING SYSTEM, AND TRANSMITTING METHOD AND RECEIVING METHOD

This application is based upon and claims the benefit of priority from the prior Chinese Patent Application CN201210270586.4, filed in the State Intellectual Property Office of the P.R.C. on Jul. 31, 2012, the disclosure of which is hereby incorporated by reference in its entirety.

FIELD OF THE INVENTION

The present disclosure relates to an optical fiber communication field, and in particular, to a transmitting system and a receiving system, and a transmitting method and a receiving method for implementing communications with multiple rates.

DESCRIPTION OF RELATED ART

In order to transmit a digital signal in a communication channel, it is necessary to modulate a sine (or cosine) carrier signal by using the digital signal. Several kinds of basic modulation methods include an Amplitude Modulation (ASK), a Frequency Modulation (FSK), a Phase Modulation (PSK) and a Quadrature Amplitude Modulation (QAM).

To achieve an information rata $R_b$ higher than a Baud Rate $R_{Baud}$, a multi-level modulation format, such as a multi-level phase modulation format (mPSK), a multi-level Quadrature Amplitude Modulation (mQAM), etc., may be utilized, where m is a positive integer power of 2, that is, $m=2^p$, where p is a positive integer. For example, when p=1, the modulation format is BPSK (also called a 2PSK), and $R_b=R_{Baud}$; when p=2, the modulation format is QPSK (also called 4PSK) or 4 QAM, and $R_b=2R_{Baud}$; when p=3, the modulation format is 8PSK or 8 QAM, and $R_b=3R_{Baud}$; when p=4, the modulation format is 16PSK or 16 QAM, and $R_b=4R_{Baud}$; when p=5, the modulation format is 32 QAM, and $R_b=5R_{Baud}$; and when p=6, the modulation format is 64 QAM, and $R_b=6R_{Baud}$. Therefore, communications with multiple information rates $R_b$ can be achieved by changing the modulation format in the case of a same Baud Rates $R_{Baud}$.

In the digital modulation techniques, usually mPSK, mQAM, and the like are also called constellation mapping, and a constellation map of the constellation mapping is obtained by using an in-phase component I and a quadrature component Q as a horizontal coordinate and a vertical coordinate, respectively. For example, an exemplary constellation map of 4 QAM is shown in FIG. 1(a), an exemplary constellation map of 16 QAM is shown in FIG. 1(b), an exemplary constellation map of QPSK is shown in FIG. 1(c), and an exemplary constellation map of 16PSK is shown in FIG. 1(d).

Currently, a fiber transmission with a rate of 100 Gb/s is achieved mainly by a single-carrier 4 QAM or QPSK modulation format, and a signal transmission with a rate of 200 Gb/s is achieved generally by the 16 QAM modulation format. The two transmissions are quite different in both hardware implementations and software designs.

If the rate of 100 Gb/s is achieved by hardware, for example, 4 QAM is employed at a transmitting side, a signal itself is ±1±j, and both the in-phase component and the quadrature component are ±1. An exemplary hardware implementation for generating the 4 QAM signal is shown in FIG. 1(e).

If a 16 QAM signal generating the rate of 200 Gb/s is achieved by hardware, the in-phase component I and the quadrature component Q are +3, +1, −1, and −3, respectively, that is, two level formats for 4 QAM are changed to four level formats for 16 QAM. Therefore, additional hardware is required when the signal is generated. An exemplary hardware implementation for generating the 16 QAM signal is shown in FIG. 1(f).

In terms of hardware, the 4 QAM modulation and the 16 QAM modulation, which have two rates, employ different hardware. Thus, the hardware has to be upgraded when the rate for 4 QAM is to be upgraded to the rate for 16 QAM, which is troublesome.

In terms of software, an exemplary constellation map of the 4 QAM modulation is shown in FIG. 1(a), and a demodulation scheme implementing this technique mainly utilizes a Constant Modulus Algorithm (CMA), because moduli of four points of the signal are all constant (this is because all of the signal points are distributed on a same circle). The CMA achieves an object of decreasing a cost function by adjusting a tap gain of a linear equalizer. A Constant Modulus Blind Equalization Algorithm is applicable for equalization of all transmitted signals with constant envelopes (called constant moduli briefly) and some transmitted signals with non-constant envelops (such as, QAM).

An error function e(n) of the CMA algorithm is:

$$e(n)=z(n)(|z(n)|^2-R)$$

where z(n) represents a receiving signal to be equalized, R represents a constant decided by the transmitted signal.

$$R = \frac{E[|x(n)|^4]}{E[|x(n)|^2]},$$

x(n) represents the transmitted signal, n represents a timing number of a receiving signal sample, and E[ ] represents an expected value. It can be known from the error function of this algorithm that the algorithm is optimal for 4 QAM signals, but is not optimal for 16 QAM signals.

16 QAM signals are distributed on three circles. Thus, if a 16 QAM demodulation is implemented by the CMA, processing has to be performed according to the points located on the three circles, respectively, and the software processing amount is 3 to 4 times as large as that for 4 QAM.

That is to say, in term of software, in the case where the information rate for 4 QAM is to be upgraded to the information rate for 16 QAM, and if the two adopts a same software demodulation manner, the obtained demodulation effects thereof are different and the processing amounts thereof are also different, whereas if the two adopts different software demodulation manners, the software has to be upgraded, which is also troublesome.

In conclusion, in relevant art, the hardware and the software have to upgraded or changed significantly so as to achieve switching among two or more transmission rates, and there is no apparatus and method for implementing communications with multiple rates on a same chip with little changes in hardware or software.

SUMMARY OF THE INVENTION

Orthogonal Frequency Division Multiplexing (OFDM) is a high speed transmission technique which may be used in a optical fiber communication environment, and its main concept is dividing a given channel into a plurality of orthogonal sub-channels in a frequency domain, where one sub-carrier is used to perform modulation on each of the sub-channels, and the respective sub-carriers are transmitted in parallel. Carriers of the respective sub-channels are orthogonal to each other in an OFDM system, and their frequency spectrums overlap with each other, which not only reduces mutual interference among the sub-carriers, but also improves a frequency spectrum utilization efficiency. OFDM belongs to a Multi-Carrier Modulation (MCM) technique, and it enhances capabilities of anti-frequency selective fading and anti-narrow band interference, and utilizes an operation manner of coordinating a power control with an adaptive modulation.

The present disclosure solves the above technical problems mentioned in the BACKGROUND part by using characteristics of the OFDM modulation and demodulation.

In view of the above, according to an aspect of the present disclosure, there is provided a transmitting system for transmitting a signal, comprising: a transmitting-side selection apparatus for selectively inputting input bit data to one of a first constellation mapping modulation apparatus and a second constellation mapping modulation apparatus based on a rate to be transmitted; the first constellation mapping modulation apparatus for performing a first constellation mapping modulation on the signal input thereto based on a selection made by the transmitting-side selection apparatus, so as to obtain a constellation-mapped signal; the second constellation mapping modulation apparatus for performing a second constellation mapping modulation on the signal input thereto based on the selection made by the transmitting-side selection apparatus, so as to obtain a constellation-mapped signal; and an OFDM modulation apparatus for performing an OFDM modulation on the constellation-mapped signal to obtain an OFDM-modulated signal for transmission.

In this way, in the case where the hardware configuration and the software configuration are uniform OFDM modulation structures, signals with different information rates may be generated by selecting different constellation mapping modulations, which makes it possible to realize switching between two rates and corresponding transmission by using the uniform hardware configuration and software configuration.

The first constellation mapping modulation may be any of a mPSK modulation and a mQAM modulation, and the second constellation mapping modulation may be any of a m'PSK modulation and a m'QAM modulation, where m and m' are positive integer orders of 2, respectively. In this way, transmitted data to be modulated may be switched between the mPSK modulation and the m'PSK modulation, between the mPSK modulation and the m'QAM modulation, or between the mQAM modulation and the m'QAM modulation.

The information rates for the first constellation mapping modulation and the second constellation mapping modulation may be different. For example, m is not equal to m'.

The transmitting system may transmit reference signals in a third constellation mapping modulation format along with the transmitted signal so as to use them for time synchronization and frequency synchronization, and channel estimation and phase noise estimation at a receiving side. Thus, the reference signals used for the time synchronization and the frequency synchronization, and the channel estimation and the phase noise estimation may be modulated at the transmitting side by using one constellation mapping modulation format, without considering whether the modulation format of the transmitted data modulated actually is mPSK, m'QAM or the like, which may further simplify the hardware and software structures.

The third constellation mapping modulation format may be BPSK, regardless of whether the modulation format of the transmitted data modulated actually is mPSK, m'QAM or the like.

According to another aspect of the present disclosure, there is provided a receiving system for receiving a signal from a transmitting system, comprising: an OFDM demodulation apparatus for performing an OFDM demodulation on the input signal to obtain an OFDM-demodulated signal; a receiving-side selection apparatus for selectively inputting the OFDM-demodulated signal to one of a first constellation mapping demodulation apparatus and a second constellation mapping demodulation apparatus based on an information rate of the OFDM-demodulated signal; the first constellation mapping demodulation apparatus for performing a first constellation mapping demodulation on the signal input thereto based on the selection made by the receiving-side selection apparatus, so as to obtain first-constellation-mapping-demodulated bit data; and the second constellation mapping demodulation apparatus for performing a second constellation mapping demodulation on the signal input thereto based on the selection made by the receiving-side selection apparatus, so as to obtain second-constellation-mapping-demodulated bit data.

In this way, in the case where the hardware configuration and the software configuration are uniform OFDM demodulation structures, signals with different information rates may be demodulated by selecting different constellation mapping demodulation manners, which makes it possible to realize demodulation for two rates by using the uniform hardware configuration and software configuration.

The first constellation mapping demodulation may be any of a mPSK demodulation and a mQAM demodulation, and the second constellation mapping demodulation may be any of a m'PSK demodulation and a m'QAM demodulation, where m and m' are positive integer orders of 2, respectively. In this way, transmitted data to be demodulated may be switched between the mPSK demodulation and the m'PSK demodulation, between the mPSK demodulation and the m'QAM demodulation, or between the mQAM demodulation and the m'QAM demodulation.

The OFDM demodulation apparatus may further comprises a time synchronization and frequency synchronization apparatus for performing time synchronization and frequency synchronization on the received signal so as to correct a time offset and a frequency offset existing in the signal; and a channel estimation and phase noise estimation apparatus for performing channel estimation and phase noise estimation on the OFDM-demodulated signal. The phase noise estimation is used to eliminate phase noises.

The receiving system may further receive reference signals in a third constellation mapping modulation format transmitted from the transmitting system, and the time synchronization and frequency synchronization apparatus and the channel estimation and phase noise estimation apparatus are implemented through the reference signals in the third constellation mapping modulation format. Thus, the reference signals used for the time synchronization and the frequency synchronization, and the channel estimation and the phase noise estimation may be demodulated at the receiving side by using one constellation mapping demodulation format, without considering whether the modulation format of the transmitted data modulated actually is mPSK, m'QAM or the like, which may further simplify the hardware and software structures.

The third constellation mapping modulation format may be BPSK, regardless of whether the modulation format of the transmitted data modulated actually is mPSK, m'QAM or the like.

The constellation mapping demodulation apparatus selected by the receiving-side selection apparatus may correspond to the constellation mapping modulation apparatus selected in the transmitting system for performing a constellation mapping modulation on the transmitted signal. For example, if the transmitting side selects the mQAM modulation, the receiving side selects the mQAM demodulation correspondingly. Thus, the receiving system may be combined with the transmitting system according to the above aspect of the present disclosure to form a complete communication system.

According to a still another aspect of the present disclosure, there is provided a transmitting method, comprising: a transmitting-side selection step for selectively performing one of a first constellation mapping modulation step and a second constellation mapping modulation step on input bit data based on a rate to be transmitted; the first constellation mapping modulation step for performing a first constellation mapping modulation on the signal input thereto based on the selection made in the transmitting-side selection step, so as to obtain a constellation-mapped signal; the second constellation mapping modulation step for performing a second constellation mapping modulation on the signal input thereto based on the selection made in the transmitting-side selection step, so as to obtain a constellation-mapped signal; and an OFDM modulation step for performing an OFDM modulation on the constellation-mapped signal to obtain an OFDM-modulated signal for transmission.

The first constellation mapping modulation may be any of a mPSK modulation and a mQAM modulation, and the second constellation mapping modulation may be any of a m'PSK modulation and a m'QAM modulation, where m and m' are positive integer orders of 2, respectively.

Information rates for the first constellation mapping modulation and the second constellation mapping modulation may be different.

The transmitting method may further comprise a step of transmitting reference signals in a third constellation mapping modulation format along with the transmitted signal, so as to use them for time synchronization and frequency synchronization, and channel estimation and phase noise estimation at a receiving side.

The third constellation mapping modulation format may be BPSK.

According to a further aspect of the present disclosure, there is provided a receiving method for receiving a signal from a transmitting system, comprising: an OFDM demodulation step for performing an OFDM demodulation on the input signal to obtain an OFDM-demodulated signal; a receiving-side selection step for selectively performing one of a first constellation mapping demodulation step and a second constellation mapping demodulation step on the OFDM-demodulated signal based on an information rate of the OFDM-demodulated signal; the first constellation mapping demodulation step for performing a first constellation mapping demodulation on the signal input thereto based on the selection made in the receiving-side selection step, so as to obtain first-constellation-mapping-demodulated bit data; and the second constellation mapping demodulation step for performing a second constellation mapping demodulation on the signal input thereto based on the selection made in the receiving-side selection step, so as to obtain second-constellation-mapping-demodulated bit data.

The first constellation mapping demodulation may be any of a mPSK demodulation and a mQAM demodulation, and the second constellation mapping demodulation may be any of a m'PSK demodulation and a m'QAM demodulation, where m and m' are positive integer orders of 2, respectively.

The OFDM demodulation step may further comprise: a time synchronization and frequency synchronization step for performing time synchronization and frequency synchronization on the received signal, so as to correct a time offset and a frequency offset existing in the signal; and a channel estimation and phase noise estimation step for performing channel estimation and phase noise estimation on the OFDM-demodulated signal. The phase noise estimation is used to eliminate phase noises.

The receiving method may further receive reference signals in a third constellation mapping modulation format transmitted from the transmitting system, where the time synchronization and frequency synchronization step and the channel estimation and phase noise estimation step are implemented through the reference signals in the third constellation mapping modulation format.

The third constellation mapping modulation format may be BPSK.

The constellation mapping demodulation step selected in the receiving-side selection step may correspond to the constellation mapping modulation step performed on the transmitted signal, which is selected at the transmitting system.

According to the aspects of the present disclosure, in the case where the hardware configuration and the software configuration are uniform OFDM modulation structures, signals with different information rates may be generated by selecting different constellation mapping modulations, which makes it possible to realize switching between two rates and corresponding transmission by using the uniform hardware configuration and software configuration. Furthermore, valid data to be transmitted may be modulated into another modulation format, such as any of mQAM, mPSK or the like. Thus, the same hardware configuration and software configuration may be flexibly used for multiple transmission rates and multiple constellation mapping modulation formats, which simplifies the hardware and the software and enhances application compatibility. Also, at the receiving side, only the uniform hardware configuration and software configuration for the OFDM demodulation are needed, and no upgrade or change is required for the hardware and software at the time of switching among the multiple rates. Additionally, by realizing the reference signals for the time synchronization and the frequency synchronization, and the channel estimation and the phase noise estimation using a same constellation mapping modulation format, the reference signals for the time synchronization and the frequency synchronization, the channel estimation and the phase noise estimation may be demodulated by using one constellation mapping demodulation format without considering whether the modulation format of the transmitted data modulated actually is mPSK, m'QAM or the like, which may further simplify the hardware and software structures.

BRIEF DESCRIPTION OF THE DRAWINGS

The above and other objects, features and advantages of the present disclosure will become more apparent by describing preferred embodiments of the invention, by way of example only, with reference to accompanying drawings, in which a like reference number refers to a like component throughout the drawings.

FIG. 1 shows schematic diagrams of constellation mapping modulations and hardware implementations thereof in relative art, where

DETAILED DESCRIPTION OF THE INVENTION

Figure 1A:
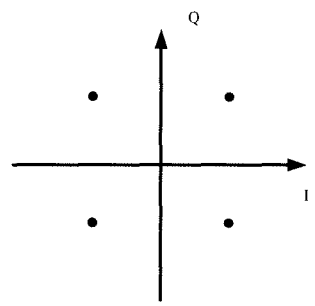
FIG. 1(a)-FIG. 1(d) illustrate constellation maps of constellation mapping modulations 4 QAM, 16 QAM, QPSK and 16PSK in relative art.
Figure 1B:
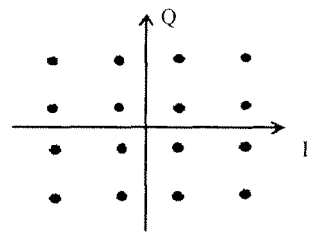
Figure 1C:
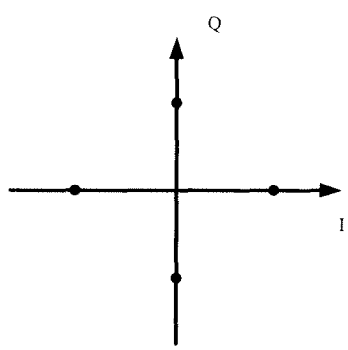
Figure 1D:
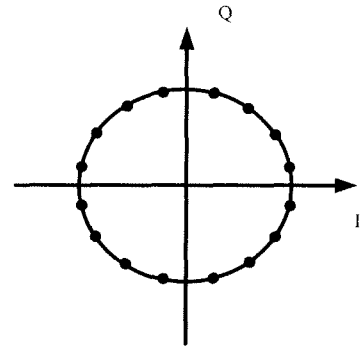
Figure 1E:
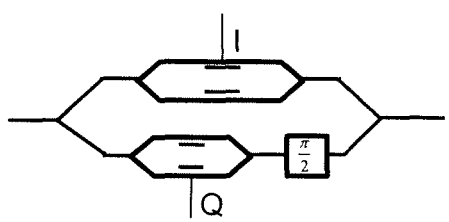
FIG. 1(e) and FIG. 1(f) illustrate schematic diagrams of hardware implementations of 4 QAM and 16 QAM, respectively.
Figure 1F:
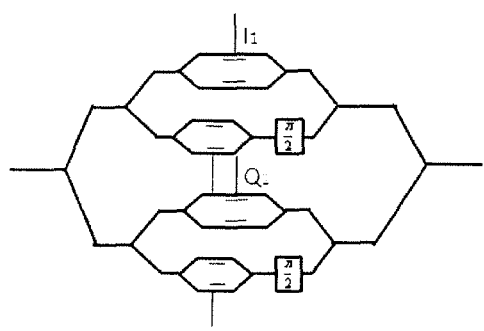

Hereinafter, preferred embodiments of the present disclosure will be described more fully with reference to the accompanying drawings. Although the preferred embodiments of the present disclosure are shown in the drawings, it is to be appreciated that the present disclosure may be embodied in various forms, and should not be construed as being limited by the embodiments set forth herein. Rather, these embodiments are provided so that the present disclosure will be more thorough and complete, and those skilled in the art can clearly understand, after reading the present disclosure, that other embodiments which are not described in the present disclosure fall within the scope of the present disclosure.

Figure 2A:
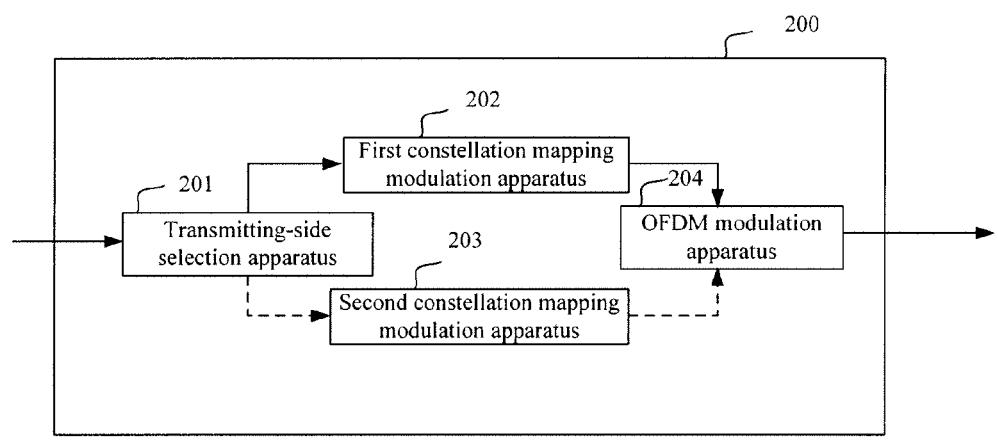
FIG. 2(a) and FIG. 2(b) are block diagrams showing a transmitting system for transmitting a signal according to an embodiment of the present disclosure.

FIG. 2(a) is a block diagram showing a transmitting system 200 for transmitting a signal according to an embodiment of the present disclosure.

The transmitting system 200 comprises: a transmitting-side selection apparatus 201 for selectively inputting input bit data to one of a first constellation mapping modulation apparatus 202 and a second constellation mapping modulation apparatus 203 based on a rate to be transmitted; the first constellation mapping modulation apparatus 202 for performing a first constellation mapping modulation on the signal input thereto based on a selection made by the transmitting-side selection apparatus, so as to obtain a constellation-mapped signal; the second constellation mapping modulation apparatus 203 for performing a second constellation mapping modulation on the signal input thereto based on the selection made by the transmitting-side selection apparatus, so as to obtain a constellation-mapped signal; and an OFDM modulation apparatus 204 for performing an OFDM modulation on the constellation-mapped signal to obtain an OFDM-modulated signal for transmission.

The transmitting-side selection apparatus 201 may comprises a switch, a switching device, a selector, or the like, as long as it may selectively input the input bit data to one of the first constellation mapping modulation apparatus 202 and the second constellation mapping modulation apparatus 203.

The first constellation mapping modulation may be any of a mPSK modulation and a mQAM modulation, and the second constellation mapping modulation may be any of a m'PSK modulation and a m'QAM modulation, where m and m' are positive integer orders of 2, respectively. In this way, transmitted data to be modulated may be switched between the mPSK modulation and the m'PSK modulation, between the mPSK modulation and the m'QAM modulation, or between the mQAM modulation and the m'QAM modulation.

Information rates for the first constellation mapping modulation and the second constellation mapping modulation may be different. For example, m may be not equal to m'. For example, the first constellation mapping modulation may be 4 QAM so as to realize an information transmission rate of 100 Gb/s, and the second constellation mapping modulation may be 16 QAM so as to realize an information transmission rate of 200 Gb/s. Of course, the first constellation mapping modulation may be, for example, QPSK so as to realize the information transmission rate of 100 Gb/s, and the second constellation mapping modulation may be, for example, 16PSK so as to realize the information transmission rate of 200 Gb/s. Or, the first constellation mapping modulation may be, for example, QPSK so as to realize the information transmission rate of 100 Gb/s, and the second constellation mapping modulation may be, for example, 16 QAM so as to realize the information transmission rate of 200 Gb/s. The present disclosure is not limited thereto, as long as the information rates for the first constellation mapping modulation and the second constellation mapping modulation are different.

In some cases, different modulation formats (for example, 4 QAM and QPSK, i.e. m=m') may be required when the transmission information rates are the same (for example, 100 Gb/s). In these cases, the embodiments of the present disclosure may be employed to implement easy and low-cost switching.

All the constellation mapping modulations in the present disclosure, such as 4 QAM and 16 QAM, may be implemented in a software modulation manner, so as to avoid adding hardware for implementing the constellation mapping modulations respectively onto a chip.

The OFDM modulation apparatus 204 in the present disclosure may adopt various known OFDM modulation manners. For example, as exemplarily illustrated in FIG. 2(b), the OFDM modulation apparatus 204 may comprise a serial/parallel converting apparatus 2041 for performing a serial/parallel conversion on input bits to generate parallel signals, a pilot inserting apparatus 2042 for inserting pilots, an Inverse Fast Fourier Transform (IFFT) apparatus 2043 for performing an Inverse Fast Fourier Transform on each of the parallel signals, a cycle prefix inserting apparatus 2044 for inserting cycle prefixes (or guard time intervals), and a parallel/serial converting apparatus 2045 for converting the parallel signals subjected to the IFFT into a serial signal. The transmitting system 200 may further comprise a Digital/Analog (D/A) converting apparatus and a low pass filter (LPF) 205 for transmitting the signal, which converts the serial signal from a digital format to an analog format, so as to output a baseband signal for transmission, and an up-converter 206 for up-converting the baseband signal for a radio frequency transmission and the like. These apparatuses and devices are well-known, and detailed descriptions thereof are omitted.

It is to be noted that the transmitting system 200 may transmit reference signals along with the signal to be transmitted, so as to use the reference signals for time synchronization and frequency synchronization, and channel estimation and phase noise estimation at a receiving side. For OFDM, modulation and demodulation are performed in a unit of frame structure. For example, for a set of 10,000 symbols, a first 100 symbols are fixed symbols A for the time synchronization and the frequency synchronization, $101^{st}$-$200^{th}$ symbols are fixed symbols B for the channel estimation, and $301^{st}$, $401^{st}$, ..., $99901^{st}$ symbols are fixed symbols C for the phase noise estimation. Besides these fixed symbols, there are data to be transmitted, for example, valid information data modulated into 4 QAM or 16 QAM. The data to be transmitted are completely independent of the signals for the synchronization, the channel estimation and the phase noise estimation. Based on this, assume that the data to be transmitted are modulated in the modulation format such as 4 QAM, 16 QAM, or the like, while all of the fixed symbols A, B and C for the synchronization, the channel estimation and the phase noise estimation may be modulated in, for example, BPSK, regardless of whether the modulation format of the transmitted data modulated actually is 4 QAM, 16 QAM or the like. That is to say, when the constellation mapped signal in 4 QAM or 16 QAM is switched, the apparatus for performing OFDM modulation on the constellation mapped signal may modulate other reference signals to be transmitted only in a uniform BPSK format. The BPSK modulation format may be implemented by software, or may be implemented by hardware although this is not often. Thus, the software configuration and the hardware configuration in the entire transmitting system, which are used for performing the 4 QAM or 16 QAM modulation on the constellation mapped signal, performing the BPSK modulation on the reference signals and for performing the OFDM modulation, may not change while realizing different information rates of the constellation mapped signal in 4 QAM or 16 QAM, so that time and costs required for upgrading the software and the hardware of the system may be reduced.

That is to say, the transmitting system 200 may further transmit reference signals in a third constellation mapping modulation format along with the signal to be transmitted, so as to use the reference signals for time synchronization and frequency synchronization, and channel estimation and phase noise estimation at the receiving side. Thus, the reference signals used for the time synchronization and the frequency synchronization, and the channel estimation and the phase noise estimation may be modulated at the transmitting side by using one constellation mapping modulation format, without considering whether the modulation format of the transmitted data modulated actually is mPSK, m'QAM or the like, which may further simplify the hardware and software structures.

In this way, in the case where the hardware configuration and the software configuration are uniform OFDM modulation structures, signals with different information rates (e.g. 100 Gb/s or 200 Gb/s) may be generated by selecting different constellation mapping modulations, which makes it possible to realize switching between two rates and corresponding transmission by using the uniform hardware configuration and software configuration.

Of course, switching among signals with more than two rates and corresponding transmissions may be further realized easily based on the present disclosure, therefore the embodiments of the present disclosure may be used in a very wide range.

Figure 3A:
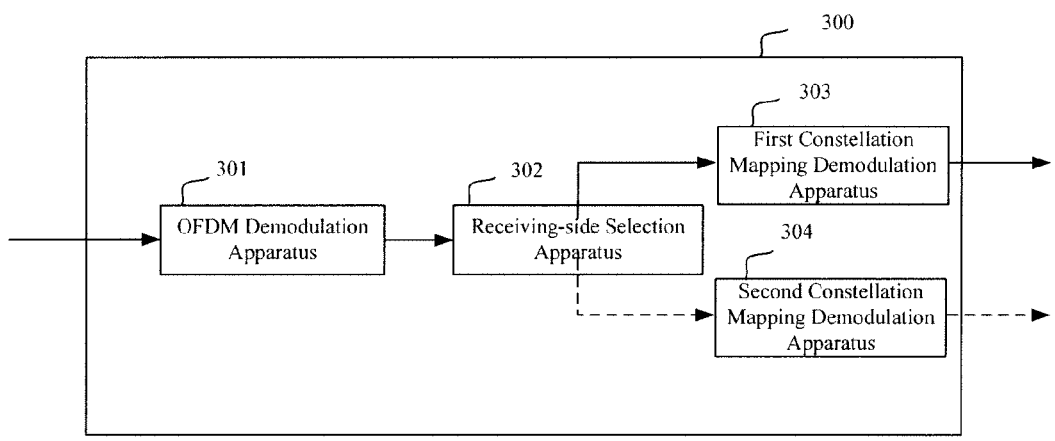
FIG. 3(a) and FIG. 3(b) are block diagrams showing a receiving system for receiving a signal according to another embodiment of the present disclosure.

FIG. 3(a) is a block diagram showing a receiving system 300 for receiving a signal according to another embodiment of the present disclosure.

The receiving system comprises an OFDM demodulation apparatus 301 for performing an OFDM demodulation on the input signal to obtain an OFDM-demodulated signal; a receiving-side selection apparatus 302 for selectively inputting the OFDM-demodulated signal to one of a first constellation mapping demodulation apparatus 303 and a second constellation mapping demodulation apparatus 304 based on an information rate of the OFDM-demodulated signal; the first constellation mapping demodulation apparatus 303 for performing a first constellation mapping demodulation on the signal input thereto based on the selection made by the receiving-side selection apparatus, so as to obtain first-constellation-mapping-demodulated bit data; and the second constellation mapping demodulation apparatus 304 for performing a second constellation mapping demodulation on the signal input thereto based on the selection made by the receiving-side selection apparatus, so as to obtain second-constellation-mapping-demodulated bit data.

Figure 3B:
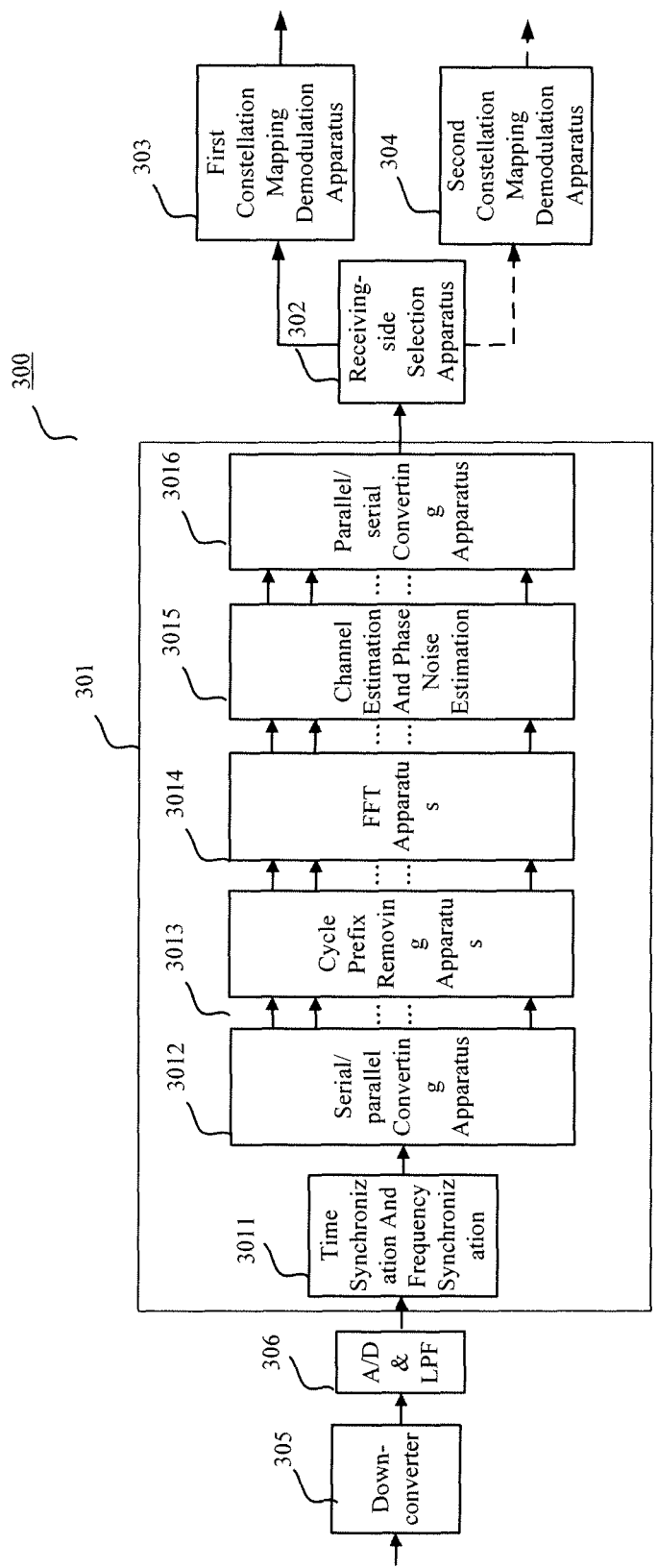

The OFDM demodulation apparatus 301 may adopt various known OFDM demodulation manners. For example, as exemplarily illustrated in FIG. 3(b), the OFDM demodulation apparatus 301 may comprises a time synchronization and frequency synchronization apparatus 3011 for performing time synchronization and frequency synchronization on the digital signal, so as to correct a time offset and a frequency offset existing in the signal, a serial/parallel converting apparatus 3012 for converting a serial signal into parallel signals, a cycle prefix removing apparatus 3013 for removing a cycle prefix, a Fast Fourier Transform (FFT) apparatus 3014, a channel estimation and phase noise estimation apparatus 3015 for performing channel estimation, phase noise estimation and the like, a parallel/serial converting apparatus 3016 for converting the parallel signals into a serial signal, etc. The receiving system 300 may further comprise a down-converter 305 for receiving the entire signal, which down-converts the RF signal into a baseband signal, and an Analog/Digital (A/D) converting apparatus and a low pass filter (LPF) 306 for converting the baseband signal into the digital signal. These apparatuses and devices are well-known in the art, and detailed descriptions thereof are omitted.

Figure 2B:
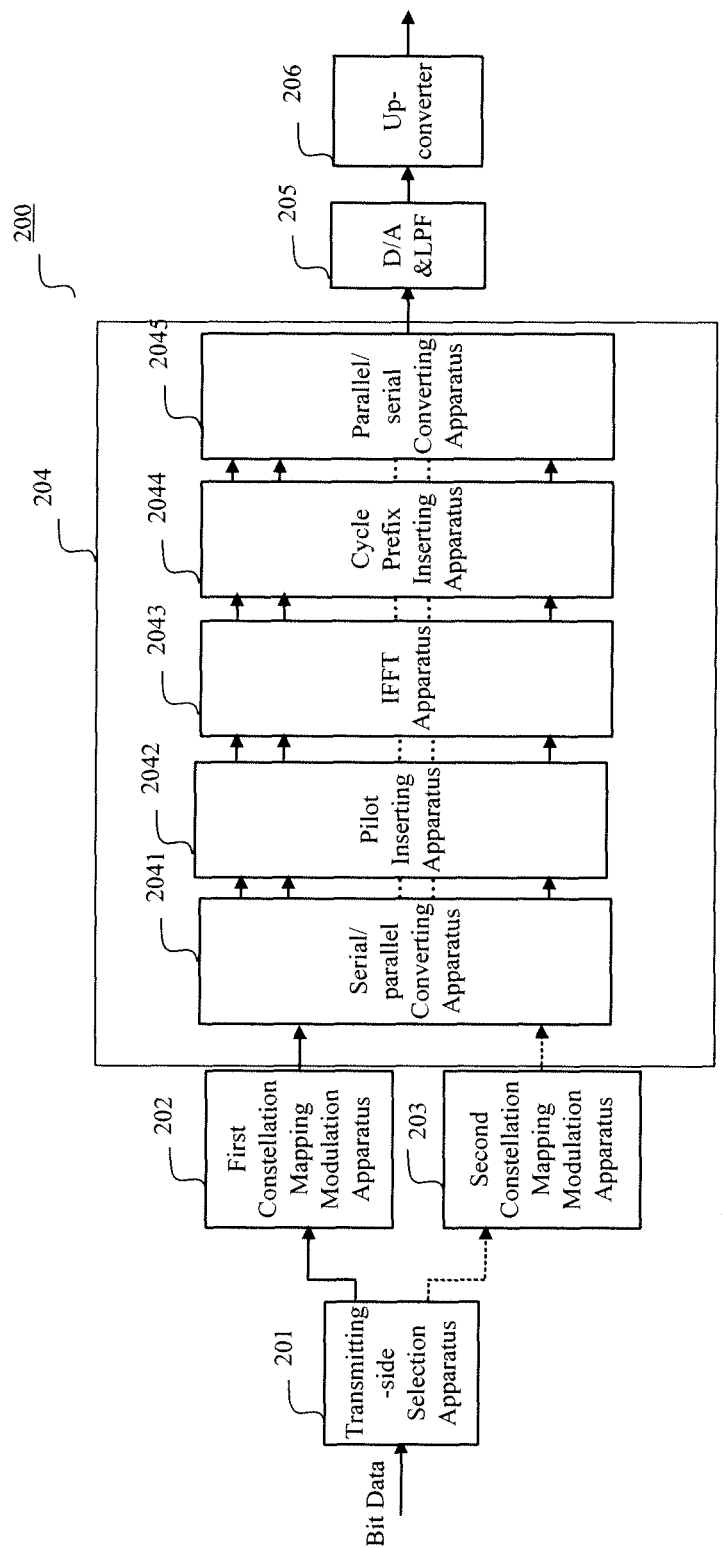

For example, in a case where the receiving system 300 receives the signal transmitted from, for example, the transmitting system 200 shown in FIG. 2(a) or FIG. 2(b), the receiving-side selection apparatus 302 shown in FIG. 3(a) may select a corresponding constellation mapping demodulation apparatus to perform a corresponding constellation mapping demodulation on the signal based on the information rate of the signal, because the rate of the transmitted signal may vary due to different selections made by the transmitting-side selection apparatus 201. For example, if the transmitting system 200 modulates the transmitted signal with the 4 QAM constellation mapping modulation format, the receiving system 300 may demodulate the signal with the 4 QAM constellation mapping demodulation format correspondingly. In this way, the constellation mapping demodulation apparatus (303 or 304) selected by the receiving-side selection apparatus 302 may correspond to the constellation mapping modulation apparatus (202 or 203) selected in the transmitting system 200 for performing the constellation mapping modulation on the transmitted signal. Thus, the receiving system 300 may be combined with the transmitting system 200 as illustrated in FIG. 2 to form a complete communication system.

Instead of only receiving the signal transmitted from the transmitting system 200 illustrated in FIG. 2(a) or FIG. 2(b), the receiving system 300 may receive signals transmitted from various other systems, and as long as the receiving system 300 may know information rates and constellation mapping modulation formats of the signals, a corresponding constellation mapping demodulation apparatus may be selected by the receiving-side selection apparatus 302 to demodulate the signals.

The first constellation mapping demodulation may be any of a mPSK demodulation and a mQAM demodulation, and the second constellation mapping demodulation may be any of a m'PSK demodulation and a m'QAM demodulation, where m and m' are positive integer orders of 2, respectively. In this way, the transmitted data to be demodulated may be switched between the mPSK demodulation and the m'PSK demodulation, between the mPSK demodulation and the m'QAM demodulation, or between the mQAM demodulation and the m'QAM demodulation.

All the constellation mapping demodulations in the present disclosure may be implemented in a software demodulation manner, so as to avoid adding hardware for implementing the constellation mapping demodulations respectively onto a chip.

As described previously, the receiving system 300 may further comprise the time synchronization and frequency synchronization apparatus 3011 for performing the time synchronization and the frequency synchronization on the received signal, so as to correct the time offset and the frequency offset existing in the signal, and the channel estimation and phase noise estimation apparatus 3015 for performing the channel estimation and the phase noise estimation on the OFDM-demodulated signal.

That is, the receiving system 300 may further receive the reference signals in the third constellation mapping modulation format transmitted from the transmitting system 200 shown in FIG. 2(a) or FIG. 2(b). The time synchronization and frequency synchronization apparatus 3011 and the channel estimation and phase noise estimation apparatus 3015 may be implemented according to the reference signals in the third constellation mapping modulation format. The third constellation mapping modulation format may be BPSK, for example. Thus, the reference signals used for the time synchronization and the frequency synchronization, and the channel estimation and the phase noise estimation may be demodulated at the receiving side by using one constellation mapping demodulation format, without considering whether the modulation format of the transmitted data modulated actually is mPSK, m'QAM or the like, which may further simplify the hardware and software structures.

Hereinafter, reasons why the reference signals for the time synchronization and the frequency synchronization, and the channel estimation and the phase noise estimation may be demodulated by using a demodulation format (for example, BPSK) different from the constellation mapping modulation format (for example, mPSK/mQAM) of the data transmitted actually will be given in detail.

Because the time synchronization is mainly implemented by an auto-correlation operation of synchronization symbols, it is independent of the modulation format adopted by the valid information data on sub-carriers in the OFDM signal. That is, the symbols A for the time synchronization may adopt the BPSK modulation format, no matter whether the modulation format of the information data is mPSK or mQAM, thus an algorithm for the time synchronization may be implemented uniformly by a BPSK algorithm.

Because the frequency synchronization estimates carrier phases by using an auto-correlation convolution operation, it is independent of the modulation format adopted by the valid information data on sub-carriers in the OFDM signal. The symbols A (as described above) for the frequency synchronization may adopt the BPSK modulation format, no matter whether the modulation format of the information data is mPSK or mQAM, thus an algorithm for the frequency synchronization may be implemented uniformly by the BPSK algorithm.

Because the channel estimation obtains a channel response matrix by using dozens of training symbols preceding the OFDM information data, it is also independent of the modulation format adopted by the valid information data on sub-carriers in the OFDM signal. The symbols B (as described above) for the channel estimation may adopt the BPSK modulation format, no matter whether the modulation format of the information data is mPSK or mQAM, thus an algorithm for the channel estimation may be implemented uniformly by the BPSK algorithm.

Because the phase noise estimation is mainly implemented by pilot sub-carriers in OFDM information frames, and the information modulated on the pilot sub-carriers is not counted into the valid information, only signals in modulation formats with low modulation orders, such as in BPSK, are modulated on a plurality of pilot sub-carriers, so as to facilitate estimation of the phase noises. Therefore, the phase noise estimation is also independent of the modulation format adopted by the valid information data on sub-carriers in the OFDM signal. The symbols C (as described above) for the phase noise estimation may adopt the BPSK modulation format, no matter whether the modulation format of the information data is mPSK or mQAM, thus an algorithm for the phase noise estimation may be implemented uniformly by the BPSK algorithm.

Incidentally, for example, a FFT apparatus (not shown) in the OFDM demodulation apparatus 301 performs a Fast Fourier Transform, and thus is also independent of the modulation format adopted by the valid information data on sub-carriers in the OFDM signal. That is to say, no matter whether the information data adopts the mPSK/mQAM modulation or the BPSK modulation, an algorithm for the FFT is not affected.

Therefore, the time synchronization, the frequency synchronization, the channel estimation, and the phase noise estimation may be performed by the BPSK algorithm uniformly in the receiving system 300, regardless of the constellation mapping modulation format used by the valid information data. Further, the software configuration is simplified in the receiving system 300, and the software configuration and the hardware configuration do not need to be upgraded or changed when data transmitted at different rates are demodulated.

In this way, in the case where the hardware configuration and the software configuration are uniform OFDM demodulation structures, signals with different information rates may be demodulated by selecting different constellation mapping demodulation manners, which makes it possible to realize demodulation for two rates by using the uniform hardware configuration and software configuration.

Of course, switching among signals with more than two rates and corresponding receptions may be further realized easily based on the present disclosure, therefore the embodiments of the present disclosure may be used in a very wide range.

Figure 4:
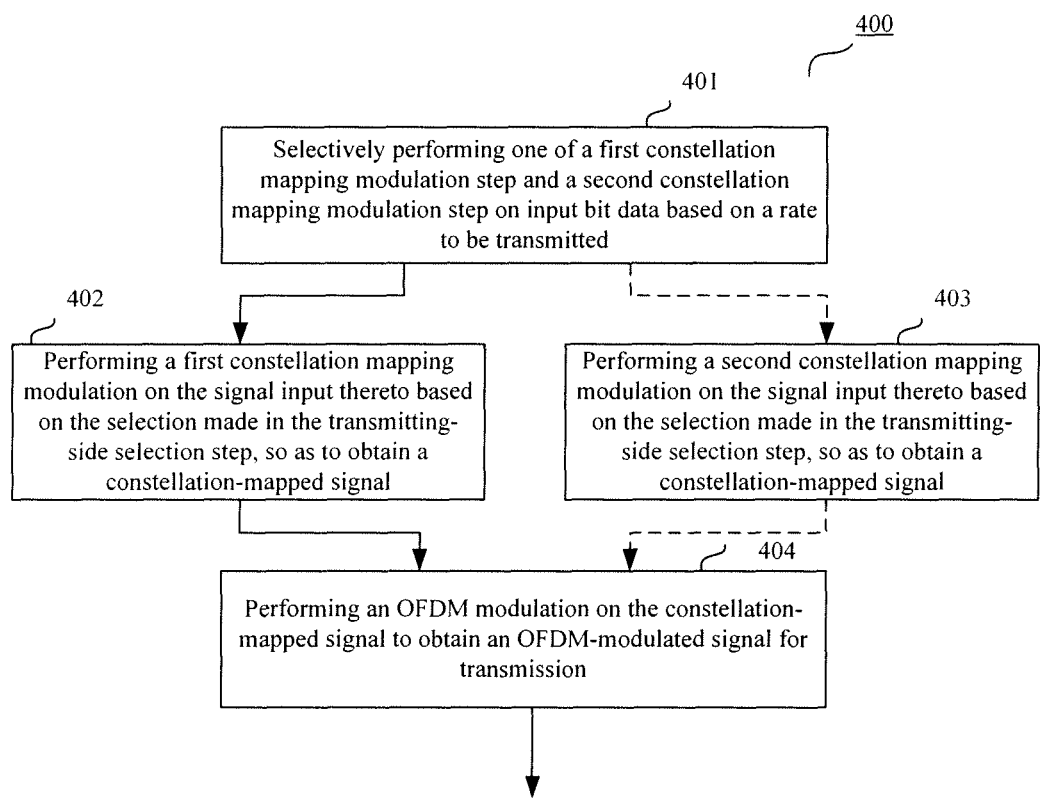
FIG. 4 is a schematic diagram illustrating a transmitting method for transmitting a signal according to a further embodiment of the present disclosure.

FIG. 4 is a schematic diagram illustrating a transmitting method 400 for transmitting a signal according to a further embodiment of the present disclosure.

The transmitting method 400 comprises: a transmitting-side selection step 401 for selectively performing one of a first constellation mapping modulation step 402 and a second constellation mapping modulation step 403 on input bit data based on a rate to be transmitted; the first constellation mapping modulation step 402 for performing a first constellation mapping modulation on the signal input thereto based on the selection made in the transmitting-side selection step, so as to obtain a constellation-mapped signal; the second constellation mapping modulation step 403 for performing a second constellation mapping modulation on the signal input thereto based on the selection made in the transmitting-side selection step, so as to obtain a constellation-mapped signal; and an OFDM modulation step 404 for performing an OFDM modulation on the constellation-mapped signal to obtain an OFDM-modulated signal for transmission.

The first constellation mapping modulation may be any of a mPSK modulation and a mQAM modulation, and the second constellation mapping modulation may be any of a m'PSK modulation and a m'QAM modulation, where m and m' are positive integer orders of 2, respectively.

Information rates for the first constellation mapping modulation and the second constellation mapping modulation may be different.

The transmitting method may further comprise a step of transmitting reference signals in a third constellation mapping modulation format along with the transmitted signal, so as to use them for time synchronization and frequency synchronization, and channel estimation and phase noise estimation at a receiving side.

The third constellation mapping modulation format may be BPSK.

Other details about the transmitting method 400 are consistent with the contents disclosed in the above embodiments, and detailed descriptions thereof are omitted herein to avoid repetition.

In this way, in the case where the hardware configuration and the software configuration are uniform OFDM modulation structures, signals with different information rates may be generated by selecting different constellation mapping modulations, which makes it possible to realize switching between two rates and corresponding transmission by using the uniform hardware configuration and software configuration.

Figure 5:
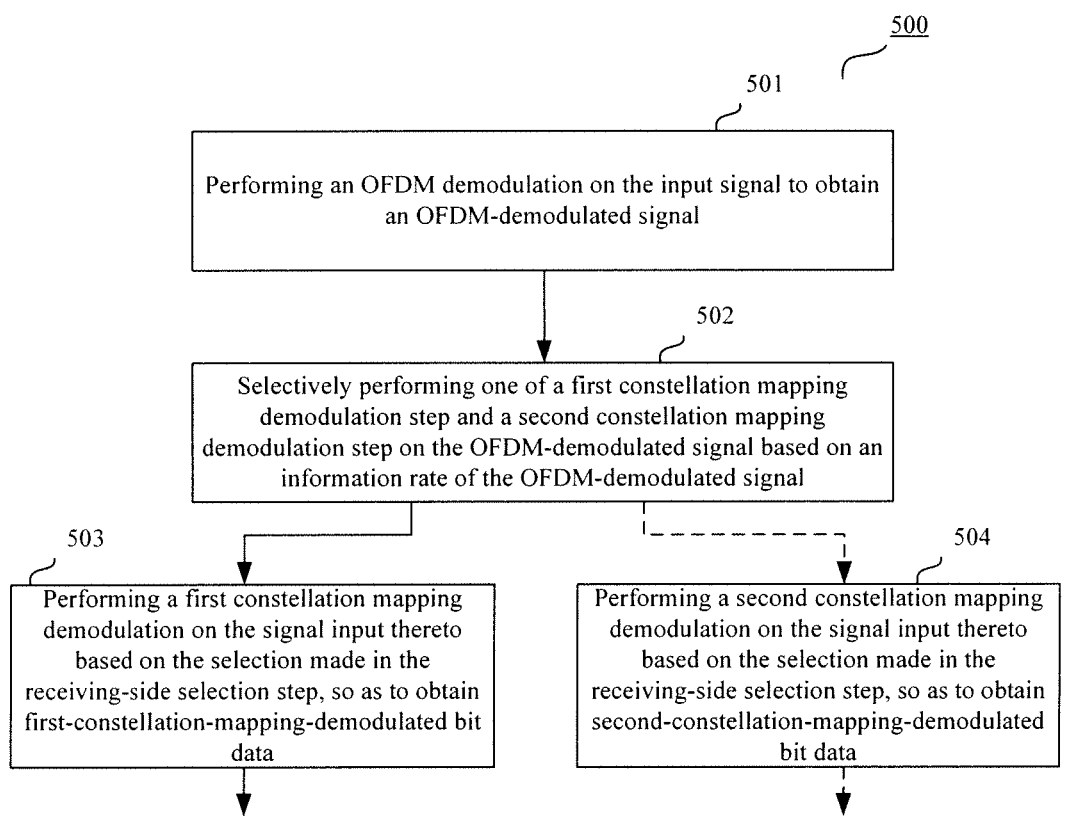
FIG. 5 is a schematic diagram illustrating a receiving method for receiving a signal according to a still another embodiment of the present disclosure.

FIG. 5 is a schematic diagram illustrating a receiving method 500 for receiving a signal according to a still another embodiment of the present disclosure.

The receiving method 500 for receiving a signal from a transmitting system comprises: an OFDM demodulation step 501 for performing an OFDM demodulation on the input signal to obtain an OFDM-demodulated signal; a receiving-side selection step 502 for selectively performing one of a first constellation mapping demodulation step 503 and a second constellation mapping demodulation step 504 on the OFDM-demodulated signal based on an information rate of the OFDM-demodulated signal; the first constellation mapping demodulation step 503 for performing a first constellation mapping demodulation on the signal input thereto based on the selection made in the receiving-side selection step, so as to obtain first-constellation-mapping-demodulated bit data; and the second constellation mapping demodulation step 504 for performing a second constellation mapping demodulation on the signal input thereto based on the selection made in the receiving-side selection step, so as to obtain second-constellation-mapping-demodulated bit data.

The first constellation mapping demodulation may be any of a mPSK demodulation and a mQAM demodulation, and the second constellation mapping demodulation may be any of a m'PSK demodulation and a m'QAM demodulation, where m and m' are positive integer orders of 2, respectively.

The OFDM demodulation step may further comprise: a time synchronization and frequency synchronization step for performing time synchronization and frequency synchronization on the received signal, so as to correct a time offset and a frequency offset existing in the signal; and a channel estimation and phase noise estimation step for performing channel estimation and phase noise estimation on the OFDM-demodulated signal. The phase noise estimation is used to eliminate phase noises.

The receiving method may further receive reference signals in a third constellation mapping modulation format transmitted from the transmitting system, where the time synchronization and frequency synchronization step and the channel estimation and phase noise estimation step are implemented through the reference signals in the third constellation mapping modulation format.

The third constellation mapping modulation format may be BPSK.

The constellation mapping demodulation step selected in the receiving-side selection step may correspond to the constellation mapping modulation step performed on the transmitted signal, which is selected at the transmitting system.

Other details about the receiving method 500 are consistent with the contents disclosed in the above embodiments, and detailed descriptions thereof are omitted herein to avoid repetition.

According to the aspects of the present disclosure, in the case where the hardware configuration and the software configuration are uniform OFDM modulation structures, signals with different information rates may be generated by selecting different constellation mapping modulations, which makes it possible to realize switching between two rates and corresponding transmission by using the uniform hardware configuration and software configuration. Furthermore, valid data to be transmitted may be modulated into another modulation format, such as any of mQAM, mPSK or the like. Thus, the same hardware configuration and software configuration may be flexibly used for multiple transmission rates and multiple constellation mapping modulation formats, which simplifies the hardware and the software and enhances application compatibility. Also, at the receiving side, only the uniform hardware configuration and software configuration for the OFDM demodulation are needed, and no upgrade or change is required for the hardware and software at the time of switching among the multiple rates. Additionally, by realizing the reference signals for the time synchronization and the frequency synchronization, and the channel estimation and the phase noise estimation using a same constellation mapping modulation format, the reference signals for the time synchronization and the frequency synchronization, the channel estimation and the phase noise estimation may be demodulated by using one constellation mapping demodulation format without considering whether the modulation format of the transmitted data modulated actually is mPSK, m'QAM or the like, which may further simplify the hardware and software structures.

The respective embodiments of the present disclosure may implement communications with multiple rates on a same chip with little changes in hardware or software.

The respective embodiments of the method and system for transmitting a signal and the method and system for receiving a signal have been described in the above disclosure, but these descriptions are only exemplary, not exhaustive, and are not limited to the disclosed embodiments, either. Furthermore, those skilled in the art may understand essential meanings of respective terms according to the present disclosure. The contents of the present disclosure are not limited to narrow meanings given by the specific terms, instead, they may indicate broad meanings in the spirit and principle of the present disclosure. It will be apparent to those skilled in the art that various modifications and variations in form and detail can be made without departing from the spirit and scope of the respective embodiments described above. It is to be understood by those skilled in the art that many modifications, combinations, sub-combinations and alternations can be made based on design requirements and other factors within the scope defined by the following claims or equivalents thereof.

What is claimed is:

1. A transmitting system for transmitting a signal, comprising:
    a transmitting-side selection apparatus for selectively inputting input bit data to one of a first constellation mapping modulation apparatus and a second constellation mapping modulation apparatus based on only a rate to be transmitted from the transmitting system determined at the transmitting side;
    the first constellation mapping modulation apparatus for performing a first constellation mapping modulation on the signal input thereto based on a selection made by the transmitting-side selection apparatus, so as to obtain a first constellation-mapped signal;
    the second constellation mapping modulation apparatus for performing a second constellation mapping modulation on the signal input thereto based on the selection made by the transmitting-side selection apparatus, so as to obtain a second constellation-mapped signal; and
    an OFDM modulation apparatus for performing an OFDM modulation on the first or second constellation-mapped signal to obtain an OFDM-modulated signal for transmission,
    wherein while the first constellation mapping modulation is a mPSK modulation, the second constellation mapping modulation is a m'PSK modulation, and while the first constellation mapping modulation is a mQAM modulation, the second constellation mapping modulation is a m'QAM modulation, where m and m' are positive integer orders of 2, respectively,
    wherein when m is not equal to m', information rates for the first constellation mapping modulation and the second constellation mapping modulation are different.

2. The transmitting system as claimed in the claim 1, wherein information rates for the first constellation mapping modulation and the second constellation mapping modulation are different.

3. The transmitting system as claimed in the claim 1, wherein the transmitting system further transmits reference signals in a third constellation mapping modulation format along with the transmitted signal so as to use them for time synchronization and frequency synchronization, and channel estimation and phase noise estimation at a receiving side.

4. The transmitting system as claimed in the claim 3, wherein the third constellation mapping modulation format is BPSK.

5. The transmitting system as claimed in the claim 1, wherein the rate to be transmitted from the transmitting system determined at the transmitting side is a rate of data to be finally outputted from the transmitting system.

6. A receiving system for receiving a signal from a transmitting system, comprising:
    an OFDM demodulation apparatus for performing an OFDM demodulation on the input signal to obtain an OFDM-demodulated signal;
    a receiving-side selection apparatus for selectively inputting the OFDM-demodulated signal to one of a first constellation mapping demodulation apparatus and a second constellation mapping demodulation apparatus based on only an information rate of the OFDM-demodulated signal;
    the first constellation mapping demodulation apparatus for performing a first constellation mapping demodulation on the signal input thereto based on the selection made by the receiving-side selection apparatus, so as to obtain first-constellation-mapping-demodulated bit data; and
    the second constellation mapping demodulation apparatus for performing a second constellation mapping demodulation on the signal input thereto based on the selection made by the receiving-side selection apparatus, so as to obtain second-constellation-mapping-demodulated bit data,
    while the first constellation mapping modulation is a mPSK modulation, the second constellation mapping modulation is a m'PSK modulation, and while the first constellation mapping modulation is a mQAM modulation, the second constellation mapping modulation is a m'QAM modulation, where m and m' are positive integer orders of 2, respectively,
    wherein when m is not equal to m', information rates for the first constellation mapping modulation and the second constellation mapping modulation are different.

7. The receiving system as claimed in the claim 6, wherein the OFDM demodulation apparatus further comprises:
    a time synchronization and frequency synchronization apparatus for performing time synchronization and frequency synchronization on the received signal so as to correct a time offset and a frequency offset existing in the signal; and
    a channel estimation and phase noise estimation apparatus for performing channel estimation and phase noise estimation on the OFDM-demodulated signal.

8. The receiving system as claimed in the claim 7, wherein the receiving system further receives reference signals in a third constellation mapping modulation format transmitted from the transmitting system, and the time synchronization and frequency synchronization apparatus and the channel estimation and phase noise estimation apparatus are implemented through the reference signals in the third constellation mapping modulation format.

9. The receiving system as claimed in the claim 8, wherein the third constellation mapping modulation format is BPSK.

10. The receiving system as claimed in the claim 6, wherein the constellation mapping demodulation apparatus selected by the receiving-side selection apparatus corresponds to a constellation mapping modulation apparatus selected in the transmitting system for performing a constellation mapping modulation on the transmitted signal.

11. The receiving system as claimed in the claim 6, wherein the information rate of the OFDM-demodulated signal is a rate of data finally outputted from the transmitting system.

12. A transmitting method, comprising:
    a transmitting-side selection step for selectively performing one of a first constellation mapping modulation step and a second constellation mapping modulation step on input bit data based on only a rate to be transmitted from the transmitting system determined at the transmitting side;
    the first constellation mapping modulation step for performing a first constellation mapping modulation on the signal input thereto based on the selection made in the transmitting-side selection step, so as to obtain a first constellation-mapped signal;
    the second constellation mapping modulation step for performing a second constellation mapping modulation on the signal input thereto based on the selection made in the transmitting-side selection step, so as to obtain a second constellation-mapped signal; and
    an OFDM modulation step for performing an OFDM modulation on the first or second constellation-mapped signal to obtain an OFDM-modulated signal for transmission, while the first constellation mapping modulation is a mPSK modulation, the second constellation mapping modulation is a m'PSK modulation, and while the first constellation mapping modulation is a mQAM modulation, the second constellation mapping modulation is a m'QAM, where m and m' are positive integer orders of 2, respectively, wherein when m is not equal to m', information rates for the first constellation mapping modulation and the second constellation mapping modulation are different.

13. The transmitting method as claimed in the claim 12, wherein information rates for the first constellation mapping modulation and the second constellation mapping modulation are different.

14. The transmitting method as claimed in the claim 12, further comprising:

transmitting reference signals in a third constellation mapping modulation format along with the transmitted signal, so as to use them for time synchronization and frequency synchronization, and channel estimation and phase noise estimation at a receiving side.

15. The transmitting method as claimed in the claim 14, wherein the third constellation mapping modulation format is BPSK.

16. The transmitting method as claimed in the claim 12, wherein the rate to be transmitted from the transmitting system determined at the transmitting side is a rate of data to be finally outputted from the transmitting system.

17. A receiving method for receiving a signal from a transmitting system, comprising:

an OFDM demodulation step for performing an OFDM demodulation on the input signal to obtain an OFDM-demodulated signal;

a receiving-side selection step for selectively performing one of a first constellation mapping demodulation step and a second constellation mapping demodulation step on the OFDM-demodulated signal based on only an information rate of the OFDM-demodulated signal;

the first constellation mapping demodulation step for performing a first constellation mapping demodulation on the signal input thereto based on the selection made in the receiving-side selection step, so as to obtain first-constellation-mapping-demodulated bit data; and the second constellation mapping demodulation step for performing a second constellation mapping demodulation on the signal input thereto based on the selection made in the receiving-side selection step, so as to obtain second-constellation-mapping-demodulated bit data, wherein while the first constellation mapping modulation is a mPSK modulation, the second constellation mapping modulation is a m'PSK modulation, and while the first constellation mapping modulation is a mQAM modulation, the second constellation mapping modulation is a m'QAM, where m and m' are positive integer orders of 2, respectively, wherein when m is not equal to m', information rates for the first constellation mapping modulation and the second constellation mapping modulation are different.

18. The receiving method as claimed in the claim 17, wherein the OFDM demodulation step further comprises:

a time synchronization and frequency synchronization step for performing time synchronization and frequency synchronization on the received signal, so as to correct a time offset and a frequency offset existing in the signal; and a channel estimation and phase noise estimation step for performing channel estimation and phase noise estimation on the OFDM-demodulated signal.

19. The receiving method as claimed in the claim 18, further comprising:

receiving reference signals in a third constellation mapping modulation format transmitted from the transmitting system, where the time synchronization and frequency synchronization step and the channel estimation and phase noise estimation step are implemented through the reference signals in the third constellation mapping modulation format.

20. The receiving method as claimed in the claim 19, wherein the third constellation mapping modulation format is BPSK.

21. The receiving method as claimed in the claim 17, wherein the constellation mapping demodulation step selected in the receiving-side selection step corresponds to a constellation mapping modulation step performed on the transmitted signal, which is selected at the transmitting system.

22. The receiving method as claimed in the claim 17, wherein the information rate of the OFDM-demodulated signal is a rate of data finally outputted from the transmitting system.

* * * * *